United States Patent [19]
Miyabe et al.

[11] 3,852,249
[45] Dec. 3, 1974

[54] ANTISTATIC AGENT FOR POLYMERIC MATERIALS

[75] Inventors: Yoshio Miyabe, Ibaragi; Takehiko Fujimoto, Kyoto; Shogo Nukina; Ataru Suwada, both of Osaka, all of Japan

[73] Assignees: Oji Yuka Goseishi Kabushiki Kaisha, Tokyo; Sanyo Chemical Industries, Ltd., Kyoto-fu, both of, Japan

[22] Filed: Mar. 5, 1973

[21] Appl. No.: 338,184

[52] U.S. Cl... 260/78.5 R, 117/138.8, 260/DIG. 17, 260/DIG. 18, 260/DIG. 21, 260/78.5 T, 260/80.73, 260/86.1 N
[51] Int. Cl.................. C08f 15/40, C08f 27/08
[58] Field of Search ....... 260/78.5 T, 78.5 R, 80.73, 260/DIG. 17, DIG. 18, DIG. 21, 86.1 N

[56] References Cited
UNITED STATES PATENTS
2,810,713 10/1957 Melamed ......................... 260/80.3
3,708,289 1/1973 Timmerman et al. ............. 96/67
3,758,445 9/1973 Cohen et al..................... 260/78 SC FOREIGN PATENTS OR APPLICATIONS
4,624,158 7/1971 Japan......................... 260/DIG. 17

Primary Examiner—Joseph L. Schofer
Assistant Examiner—John Kight
Attorney, Agent, or Firm—Wenderoth, Lind & Ponack

[57] ABSTRACT

An antistatic agent for polymeric materials such as synthetic papers comprises a water-soluble polymer containing, as indispensable components, first and second constituent units of specific formulas and a third constituent uint based on a copolymerizable carboxylic acid or a salt thereof.

The specific formulas are

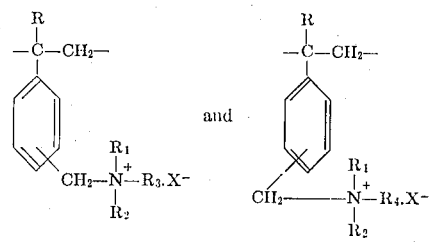

where: R is hydrogen atom or an alkyl group with at the most 4 carbon atoms; $R_1$, $R_2$, and $R_3$ are respectively alkyl groups each having at the most 4 carbon atoms; $R_4$ is an alkyl group having at least 16 carbon atoms; and $X^-$ is an anion.

14 Claims, No Drawings

ANTISTATIC AGENT FOR POLYMERIC MATERIALS

BACKGROUND

This invention relates generally to agents for preventing the generation or accumulation of electrostatic charges on polymeric materials and more particularly to so-called antistatic agents used for the purpose of modifying the surfaces of polymeric materials such as synthetic papers. More specifically, the invention relates to water-soluble antistatic agents for polyolefin synthetic papers containing fillers.

Because of their numerous excellent characteristics, synthetic papers in film form containing fillers are being used widely in various fields, and future developments of these synthetic papers for use in place of conventional papers (natural papers) based on cellulose fibers are being looked forward to with high expectations.

On the other hand, however, these known synthetic papers have a number of serious disadvantages. Accordingly, the industries concerned are expending great effort in overcoming these drawbacks, but many problems still remain unsolved. Frequently encountered examples of these problems are deleterious effects of static electricity due to remarkable generation and accumulation of electrostatic charges, caused principally by a surface phenomenon, and insufficient suitability for printing or printability, which problems are not encountered in natural papers.

In the present state of the art, however, the most common measure for preventing the undesirable effects of static electricity, for example, comprises merely the use of surface active agents applied by blending or by surface treatment. By such a measure, it is difficult to preserve the printability of the papers over long periods of time. Particularly in the case of offset printing wherein moistening water is used, the printability of these synthetic papers is impaired because of harmful effects such as spreading and blurring of the ink. The printability is further impaired in monochrome and continuous printing by the tendency of the ink to be undesirably transferred and, further, to give rise to back trapping. in addition, even the deleterious effects of static electricity have not been satisfactorily overcome.

Surface treating agents of high-polymer type used for preventing electrostatic charges or increasing electroconductivity are known in some fields, a representative example being those disclosed in U.S. Pat. No. 3,011,918 and Japanese Pat. Publication No. 15564/1969 and having the In of modifying special papers such as electrocommunication recording papers. While deleterious effects due to static electricity can be prevented by the applicaton of these electroconductive agents to synthetic papers, the resulting papers are deficient in printability, filminess, and slipping quality and lack practicability to a great extent when considered from an overall viewpoint. The term "filminess" herein used in respect of electroconductive agents means that the electroconductive agent easily forms film and that the film thus produced has surface properties such as hardness sufficiently high for the film to constitute a surface of paper.

Electrostatic problems are also involved in handling polymeric materials other than synthetic papers.

SUMMARY

As a result of our detailed study relating to antistatic agents capable of comprehensively satisfying the requirements for synthetic papers based on polyolefins and containing fillers, we have found that water-soluble treating agents based on specific polymers and having the following characteristics are highly effective for the above mentioned filler-containing synthetic papers based on the polyolefins. We have found, moreover, that the problems such as those of printability, static electricity, filminess and film characteristics, writability, and texture or tactile feel can be substantially solved in a well-balanced manner at once by the use of these treatment agents of the following characteristics.

Each of these water-soluble treatment agents comprise a polymer containing, as indispensable components, constituent units respectively represented by the formula

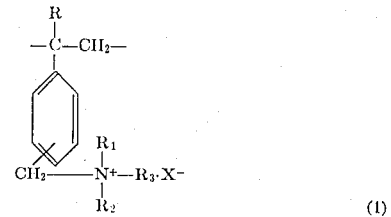

and the formula

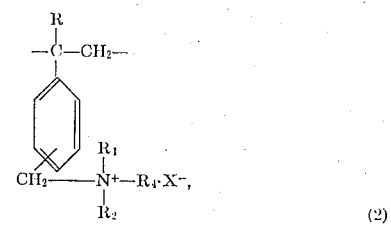

where:
R is hydrogen atom or an alkyl group with 4 or fewer carbon atoms;
$R_1$, $R_2$, and $R_3$ are independently alkyl groups each having 4 or fewer carbon atoms;
$R_4$ is an alkyl group having 16 or more carbon atoms; and
$X^-$ is an anion,
and a constituent unit (hereinafter referred to as a carboxylic acid unit) obtained from a copolymerizable carboxylic acid or a salt thereof.

According to this invention in another aspect thereof, there is provided a synthetic paper comprising a polyolefin film containing a fine filler and at least one layer of a coating of an antistatic according to the invention applied on a surface of the polyolefin film.

The nature, utility, and further features of this invention will be apparent from the following detailed description beginning with a consideration of general aspects of the invention and concluding with specific ex-

DETAILED DESCRIPTION

In Formula (1) representing a monomer unit of the polymer constituting an antistatic agent of the invention, the symbols $R_1$, $R_2$, and $R_3$ respectively represent alkyl groups such as $-CH_3$, $-C_2H_5$, $-C_3H_7$, and $-C_4H_9$. $X^-$ constitutes a couteranion of quarternary ammonium salts such as sulfonic acid ion, halogen ion, alkyl sulfate ion, and fatty acid ion. Specific examples are as follows:

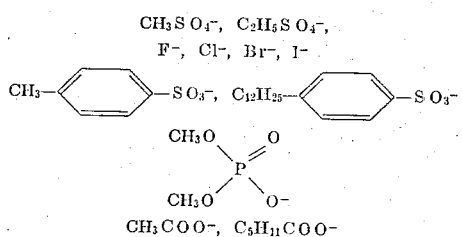

Particularly, ions of halogens, sulfonic acids, lower fatty acids, and the like are desirable.

In Formula (2), the symbols $R_1$, $R_2$, $R_3$, and $X^-$ are the same as in Formula (1). $R_4$ is an alkyl group of 16 or more carbon atoms as, for example, $-C_{16}H_{33}$, $-C_{18}H_{37}$, and $-C_{20}H_{41}$. Long-chain alkyl groups, particularly of a number of carbon atoms of up to approximately, 24, especially of the order of from 18 to 20, are desirable.

Examples of the copolymerizable carboxylic acid and salts thereof suitable for use in accordance with this invention are acrylic acid, methacrylic acid, α-propylacrylic acid, α-cyclohexylacrylic acid, α-chloroacrylic acid, α-cyanoacrylic acid, maleic anhydride which can be transformed into the acid by hydrolysis after copolymerization, and salts thereof. Examples of salts are those of metals such as Li, Na, K, Mg, Ca, Zn, Cd, Al, and Sn, $NH_3$, and amines such as trimethylamine, triethanolamine, and diethanolamine.

The proportions within the copolymer of the monomer units represented by Formulas (1) and (2) and the carboxylic acid unit are variously adjusted in accordance with factors such as the required characteristics, e.g., antistatic performance and printability and filminess of the treated synthetic paper, type of monomer components to be copolymerized, and the type, production process, surface structure, and other pertinent characteristics of the synthetic paper to constitute the substrate material. In general, however, the practically desirable proportions, in percent by weight, of these three components are as follows.

Structural unit of Formula (1):
from 1 to 40 percent, preferably from 3 to 20 percent.

Structural unit of Formula (2):
from 50 to 95 percent, preferably from 70 to 95 percent.

carboxylic acid unit:
from 0.1 to 10 percent, preferably from 0.5 to 5 percent.

It is desirable that specific combinations of particular compositions be such that, components, the copolymer formed from the given monomer is so water-soluble that an aqueous solution of the desired concentration can be formed.

While the monomer component of Formula (1) is a component for contributing principally to the antistatic performance and water solubility of the agent, its effectiveness cannot be fully exhibited if its quantity is less than 1 percent by weight. Its preferable quantity is from 3 to 20 percent by weight.

The monomer component wherein a long-chain alkyl group represented by Formula (2) is bonded to a nitrogen atom forming a quarternary ammonium salt is a component for contributing principally to the improvement of the affinity to thereof hydrophobic substrate material of the synthetic paper and to the improvement in the suitability of the synthetic paper to continuous printing in offset printing. While the quantity of this component should be at least 50 percent by weight and may be even more by any amount, a preferable range threof is from 70 to 95 percent by weight in view of the necessity for balance with the other copolymer components.

The component comprising a copolymerizable carboxylic acid or a salt thereof is a component for contributing principally to the film formability and the adhesiveness of the antistatic agent and to the property thereof to retain moistening water in offset printing. Of the three components, this component is capable of exhibiting ample effectiveness with the smallest quantity. However, it is ordinarily used in a quantity of 0.1 percent by weight or more. If this quantity exceeds 10 percent by weight, the antistatic effect will decrease, and the product viscosity will increase, whereby the workability will drop, and, furthermore, dissolving in water will become difficult.

The polymer in this invention can be caused to contain, in addition to the three indispensable constitutional units, other constitutional units in accordance with the intended use of the product. Examples of monomers for providing constitutional units of this type are those having ehtylenical double bonds such as styrene, and nucleus- and/or side-chain-substituted styrenes such as α-methylstyrene; acrylonitrile, and substituted acrylonitriles such as methacrylonitrile; acrylamide, C- and/or N- substituted acrylamides such as N-hydroxyethylacrylamide; and vinyl esters such as vinyl acetate and vinyl propionate.

While the contents of these comonomers may be selected at will within a range such that the copolymer formed has the desired water solubility, the upper limit is, for example, 25 percent by weight, preferably 20 percent by weight in the case of styrene or α-alkyl styrene where the alkyl contains from 1 to 4 carbon atoms.

The polymers in this invention can be prepared, for example, by a process in which the monomers of the constitutional units are copolymerized in the presence of a polymerization initiator such as an inorganic or organic peroxide or by a process in which a precursor polymer is produced from styrene, and the monomer for the carboxylic acid unit first copolymerized, and then chloromethylation and subsequent reaction with a tertiary amine on the precursor polymer are carried out thereby to introduce a quarternary ammonium base.

While there is no special limit to the molecular weight of the copolymer provided that it exhibits a viscosity range at the process temperature which does not adversely effect its use, a copolymer having a viscosity of the order of from 5,000 to 100,000 centipoise at 25°C in a 15 percent aqueous solution is, in general, desirable for practical use. If the molecular weight is excessively large, the viscosity of the product will be high and give rise to problems in workability such as deficiency in uniform adhesiveness at the time of treatment. On the other hand, if the molecular weight is too low, there will be the possibility of deleterious effects such as inadequate film formability and migration of printing ink into moistening water in the treated synthetic paper, whereby the characteristics of the product as a high-polymer treatment agent are impaired.

The antistatic agent of this invention is soluble in water to produce, in general, viscous, light yellow liquid. While it is possible to render this agent difficult to dissolve in water by regulating the compositions and proportions of the individual monomers of the three components, the agent is generally water soluble. In the solventless state, this agent is a non-tacky mass ranging from a wax to a solid of a relatively high melting point of a light yellow to brown color.

The substrate material to be treated with the antistatic agent of this invention is an article of a thermoplastic resin preferably in the form of film or a film laminate containing a filler. Examples of preferred resins are: polyolefin resins, e.g., homopolymers or copolymers of ethylene and propylene; homopolymer or copolymers of styrene; homopolymer or copolymers of vinyl chloride; and other homopolymers and copolymers.

The most typical substrates are synthetic papers, which comprise film or a film laminate of such a resin as enumerated above, especially a polyolefin resin loaded with a fine filler, and which have been made paper-like preferably by stretching film of such filler-containing resin.

Certain particulars of the synthetic paper such as its additives, e.g., pigments, thermal stabilizer, antioxidant, etc., existence or nonexistence of stretch, single-layer or laminated structure, and thickness may be variously modified in accordance with the necessity. For example, an organic or inorganic filler, such as clay, talc, silica, alumina, barium sulfate, titanium white, calcium carbonate, or a powder of an infusible resin, or a pigment are admixed with a polypropylene, and the resulting mixture is formed by a process step such as extruding, casting, or calendering into a film, which is rendered into a material resembling paper by stretching or being caused to foam and become porous according to necessity. In addition, there are synthetic papers of laminated structure as disclosed, for example in the specifications of Canadian Pat. No. 854,685 and British Pat. No. 1,268,823, which are herein incorporated as references.

For applying the treatment agent of this invention to a synthetic paper, various methods can be resorted to. For example, the treatment agent of this invention which has been diluted with water or a suitable organic or aqueous-organic solvent can be applied uniformly as a coating on the surface of the paper by means of a device such as a size press or a roll coater, or the agent can be applied by immersion treatment and drying. In addition, the agent can be admixed with an aqueous dispersion of one or more coating components such as pigments such as clay, calcium carbonate, talc, and titanium oxide, and adhesive materials such as casein, starch, polyvinyl alcohol, and natural or synthetic rubber latex, and the resulting mixture can then be applied by means for coating films.

In order to apply the treatment agent of this invention as a coating with high efficiency and to assure high product quality, the treatment can be carried out after the surface of the substrate or paper material being modified by a process step such as a chemical procedure such as treatment with a bichromate and an electric procedure such as corona discharge.

A distributive quantity of the agent controlled to lie within a range of the order of from 0.02 to 1 gram, in terms of the polymer solid content, per square meter of the synthetic paper surface at the time of surface treatment is sufficient. The upper limit of this range is set not for any particular reasons of performance but principally for reasons of economy. In the case where various additives such as pigments are added, the blending proportions may be selected with the above indicated coating quantity range considered as a reference.

The antistatic agents of this invention as described above can be improved with respect to their various characteristics such as electrostatic charge preventive property, printing characteristics, particular suitability for offset printing, adhesiveness of the antistatic agent film to synthetic papers, film hardness, and affinity relative to hydrophobic synthetic papers. For this purpose, the fundamental condition in the production of the copolymer is the selection of the three monomer components having respective characteristic features in a well-balanced manner so as to attain the optimum combination of the improvements in the above enumerated characterisitics when considered as a whole in each case.

A synthetic paper treated through the use of the antistatic agent is substantially comparable to so-called art paper, coated paper, and other papers based on natural papers in printability and printing workability. Another advantageous feature of the antistatic agent of this invention is that, while it has a long-chain alkyl group, it is balanced so as to be water-soluble as a whole, whereby treatment in an aqueous solution is possible thereby causing no trouble due to the use of toxic or inflammable organic solvents, and, moreover, there is no necessity of using an organic solvent, whereby the cost of producing synthetic papers can be reduced. Still another advantageous feature is that, by carrying out treatment with the antistatic agent of this invention, a non-tacky solid feel and smoothness is imparted to the synthetic paper, whereby it exhibits a high papery quality.

Thus, synthetic papers treated with the antistatic agent of this invention exhibits overall superiority over synthetic papers treated with other known antistatic agents of high-polymer type or of low-polymer type.

In order to indicate more fully the nature and utility of this invention, the following specific examples of practice constituting preferred embodiments of the invention and results are set forth, it being understood that these examples are presented as illustrative only and that they are not intended to limit the scope of the invention. Throughout these examples, quantities specified in parts and percent are by weight.

EXAMPLE 1.1

In accordance with ordinary process, the following five types of antistatic agents including the antistatic agent of this invention were prepared.

(A)
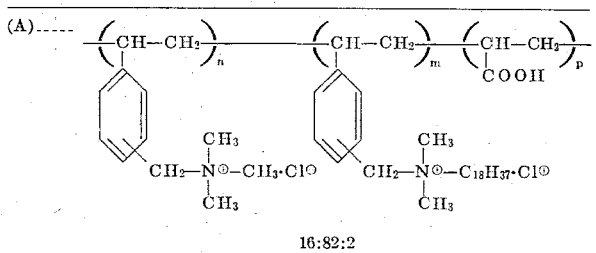

16:82:2

Viscosity of 10% aqueous solution: 15,000 cps./25° C.

(B)
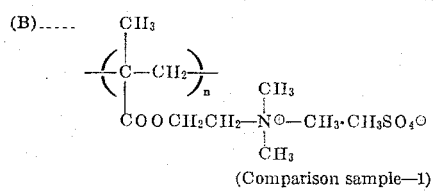

(Comparison sample—1)

The synthetic paper used for treatment with these antistatic agents was made in the following manner: a polypropylene of a melt index (M.I.) of 0.8 was kneaded in an extruder operated at 270°C, extruded through a die, and cooled to a temperature below 40°C by a cooling device, therby to obtain an unstretched film. This film was stretched 5.5 times by means of a longitudinal stretching machine.

A composition prepared by mixing 15 percent of talc and 15 percent of titanium white with a polypropylene of a M.I. of 4.0 was extruded onto both surfaces of this film monoaxially stretched in the longitudinal direction thereby to produce a laminated structure, which was then stretched 7.5 times in the transverse direction at an elevated tempeature and then cooled in that state. The lateral edges of the cooled sheet thus obtained were trimmed off, and the sheet was wound into a roll. This 3-ply sheet was made up of a base layer of 60-micron thickness and surface or papery layers of 40-micron thickness (20 microns each side) on the two opposite sides thereof and was an opaque structure.

Respective samples of this sheet were coated and treated by rolls with the five types of antistatic agents (A) through (E) specified above in a distributive quantity of 0.05 g./square meter. Each sample thus treated was evaluated by customary standard methods with respect to characteristics such as antistatic performance, Table 1

| | | Characteristics of treated synthetic paper | | | | |
|---|---|---|---|---|---|---|
| Sample | Film characteristic | Offset printing | | | Damping water contamination | Remarks |
| | | Printing irregularity | Ink transfer | Static electricity | | |
| (A) | non-tacky or dry feel | O | O | O | none | antistatic agent of this invention |
| (B) | tacky feel | X | X | Δ | none | Comparison Sample — 1 |
| (C) | non-tacky or dry feel | X | X | O | none | Comparison Sample — 2 |
| (D) | (do.) | X X | X X | Δ | none | Comparison Sample — 3 |
| (E) | slightly oily | Δ | Δ | X | none | Comparison Sample — 4 |
| Blank Art paper | non-tacky or dry feel | O O | O O | X X O | none none | — — |

Symbols — O: none    Δ: slightly existent
X: existent    X X: greatly existent (C)
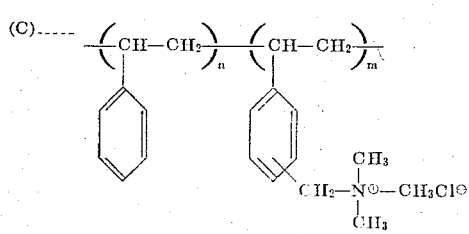

(Comparison sample—2)

(D)
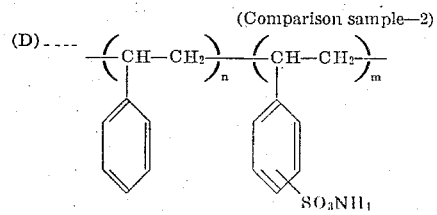

(Comparison sample—3)

(E)
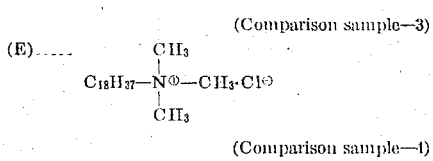

(Comparison sample—4)

printability, and filminess and film characteristics, whereupon the results shown in Table 1 were obtained. A synthetic paper was made by the procedure described above except that the treatment with the antistatic agent was not carried out and similarly evaluate under the designation "blank".

As is apparent from Table 1, a synthetic paper treated with the antistatic agent of this invention is free of deleterious effects due to static electricity in printing processes and also has excellent printability, being superior in overall characteristics to synthetic papers treated with similar known antistatic agents of the poly quaternary ammonium salt type or low polymer type and being close to natural papers.

EXAMPLE 2

A copolymer of styrene and maleic anhydride (as a 40-percent solution in toluene, of a viscosity of 2,500 cps/25°C) was chloromethylated by a known process and then quaternarized with trimethylamine and cetyldimethylamine, whereupon a polymer having the following weight ratios of the three monomer units was produced.

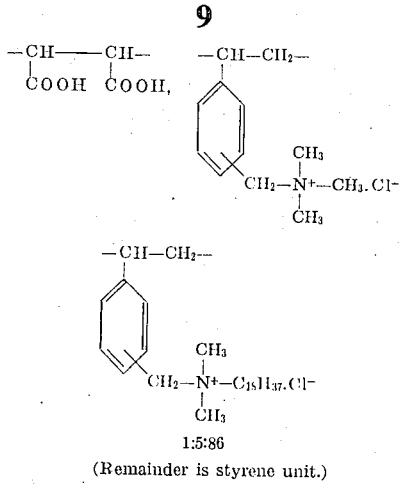

1:5:86

(Remainder is styrene unit.)

Next, a 2-percent aqueous solution of this polymer was applied as surface coating by means of a size press on a sample synthetic paper prepared in the following manner: 20 percent of calcined kaolinite clay and 10 percent of titanium white were mixed with 60 percent of a polyethylene of a M.I. of 0.8 and a specific gravity (S.G.) of 0.95 and 10 percent of a polyethylene of a M.I. of 4 and a S.G. of 0.92. The resulting mixture was kneaded in an extruder operated at 260°C and then extruded through a tubular die into an opaque unstretched film of 70-micron thickness. This film was then treated with a corona discharge treatment apparatus of Lepel type under the conditions of a treatment electric power of 400 watts (treatment current of 0.87 A) and a 1.6-mm. spacing between electrodes at a travel speed of 20 m/minute, whereupon the above mentioned sample synthetic paper was obtained.

This paper, after the above mentioned coating, was found to have a surface resistivity of $7 \times 10^9$ Ω (20°C, 50 percent relative humidity) and excellent antistatic effect. Furthermore, when this coated paper was subjected to continuous off-set printing with four colors by the customary process, the result was found to be comparable to that obtained with a conventional coated paper.

EXAMPLE 3

An aqueous solution of an antistatic agent of this invention of the following weight ratios of the three monomer units was prepared beforehand.

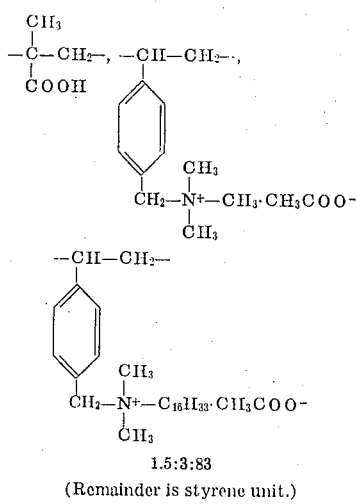

1.5:3:83

(Remainder is styrene unit.)

Then 15 percent of diatomaceous earth and 5 percent of titanium white were mixed with 40 percent of polyethylene of a M.I. of 1 and a S.G. of 0.96, 20 percent of a polypropylene of M.I. of 1.2 and a S.G. of 0.89, and 20 percent of an ethylene - vinyl acetate copolymer of a vinyl acetate content of 10 percent and a M.I. of 3, and the resulting mixture was kneaded in an extruder operated at 240°C, extruded through a die, and cooled to a temperature below 40°C thereby to produce a non-stretched film.

This film was stretched 5.5 times in the longitudinal direction and then 7 times in the transverse direction, whereupon an opaque film was obtained. This film was subjected to surface oxidation by means of a Lepel-type, corona-discharge processing device. Then the aqueous solution of the antistatic agent prepared in the above described manner was applied as a coating on the resulting film.

Then, by ordinary procedures, photogravure printing and offset printing were carried out on the film thus coated. As a result, the film exhibited excellent printability, and no adverse effect due to static electricity could be detected in an atmosphere of a temperature of 15°C and a relative humidity of 40 percent.

COMPARISON EXAMPLE

In accordance with ordinary process, there were prepared the following two types of antistatic agents which were lacking in one of indispensable constituents in the antistatic agent of this invention.

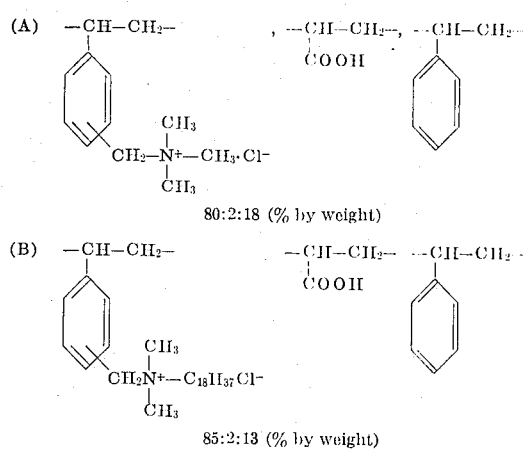

The antistatic agent (A) had a viscosity of 120 pcs. in 30 percent by weight solution at 25°C, and the agent (B) was water-insoluble.

The same synthetic paper as in Example 1 was treated with each of the agents (A) and (B) in the same procedure as in Example 1, except that the agent (B) was used in methanol solution.

The paper treated with the agent (A) had a good antistatic property, but had a poor printability. The paper treated with the agent (B) was poor in antistatic property.

What we claim is:

1. A water-soluble antistatic agent for polymeric materials, said antistatic agent comprising a water-soluble polymer containing, as indispensable components, constituent units respectively represented by the formula

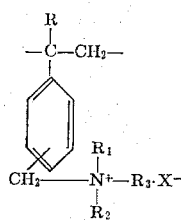

and the formula

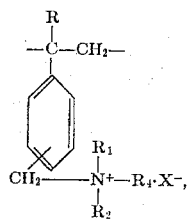

Where:

R is hydrogen atom or an alkyl group having at the most 4 carbon atoms;

$R_1$, $R_2$, and $R_3$ are independently alkyl groups each having at the most 4 carbon atoms;

$R_4$ is an alkyl group having at least 16 carbon atoms; and $X^{\ominus}$ is an anion, and a constituent unit obtained from a copolymerizable carboxylic acid or a salt thereof.

2. An antistatic agent as set forth in claim 1 in which said copolymerizable carboxylic acid or a salt thereof is a member selected from the group consisting of acrylic acid, methacrylic acid, maleic acid, and salts of said acids.

3. An antistatic agent as set forth in claim 1 in which said salt is selected from a group consisting of alkali metal salts, ammonium salts, and ethanol amine salts.

4. An antistatic agent as set forth in claim 1 in which said polymer is a polymer wherein $R_1$ and $R_2$ are respectively methyl groups, $R_3$ is a methyl group, and $R_4$ is a long-chain alkyl group having from 16 to 24 carbon atoms, R being hydrogen.

5. An antistatic agent as set forth in claim 1 in which said water-soluble polymer is a polymer comprising from 1 to 40 percent by weight of the constituent unit of Formula (1), from 50 to 95 percent by weight of the constituent unit of formula (2), and from 0.5 to 10 percent by weight of the constituent unit derived from the copolymerizable carboxylic acid or a salt thereof.

6. An antistatic agent as set forth in claim 1 in which said polymer contains, in addition to said three constituent units, up to 25 percent by weight of a unit of the following Formula:

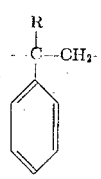

where R is hydrogen or an alkyl group of at most 4 carbon atoms.

7. An antistatic agent as set forth in claim 1 in which said polymeric materials are synthetic papers comprising a polyolefin film containing a fine filler.

8. An antistatic agent as set forth in claim 7 in which said copolymerizable carboxylic acid or a salt thereof is a member selected from the group consisting of acrylic acid, methacrylic acid, maleic acid, and salts of said acids.

9. An antistatic agent as set forth in claim 7 in which said salt is selected from the group consisting of alkali metal salts, ammonium salts, and ethanol amine salts.

10. An antistatic agent as set forth in claim 7 in which said polymer is a polymer wherein $R_1$ and $R_2$ are respectively methyl groups, $R_3$ is a methyl group, and $R_4$ is a long-chain alkyl group having from 16 to 24 carbon atoms, R being hydrogen.

11. An antistatic agent as set forth in claim 7 in which said water-soluble polymer is a polymer comprising from 1 to 40 percent by weight of the constituent unit of Formula (1), from 50 to 95 percent by weight of the constituent unit of Formula (2), and from 0.5 to 10 percent by weight of the constituent unit derived from the copolymerizable carboxylic acid or a salt thereof.

12. An antistatic agent as set forth in claim 7 in which said polymer contains, in addition to said three constituent units, up to 25 percent by weight of a unit of the following Formula:

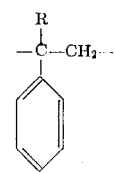

where R is hydrogen or alkyl group of at most 4 carbon atoms.

13. An antistatic agent as set forth in claim 7 in which said synthetic papers are based on polyolefins selected from the group consisting of polyethylene, polypropylene, and resinous ethylene-propylene copolymers.

14. An antistatic agent as set forth in claim 7 in which said synthetic paper comprises a film of the polyolefin containing the fine filler stretched in at least one axial direction.

* * * * *